March 1, 1927.

W. G. CHASE

TIRE CHAIN

Filed Feb. 5, 1925

1,619,783

Inventor:
William G. Chase,
by Cheever & Cox
Attys.

Patented Mar. 1, 1927.

1,619,783

UNITED STATES PATENT OFFICE.

WILLIAM G. CHASE, OF OAK PARK, ILLINOIS.

TIRE CHAIN.

Application filed February 5, 1925. Serial No. 6,947.

My invention relates to anti-skid tire chains. A common form of chain consists of two circumferential chains which lie on opposite sides of the tire, and a number of cross chains spaced a few inches apart and affording traction. In practice these cross chains are subjected to great strain and wear, and have to be frequently renewed. The object of my invention is to provide a construction by which the renewing of the cross chains will be facilitated. Another object is to provide a construction which shall be rugged and which will securely hold the cross chain in place after it is attached.

I accomplish my objects by the construction illustrated in the accompanying drawings in which—

Figures 3 and 4 illustrate the preferred manner of attaching the terminal member to the links of the circumferential chain.

Like numerals denote like parts throughout the several views.

Figure 4:
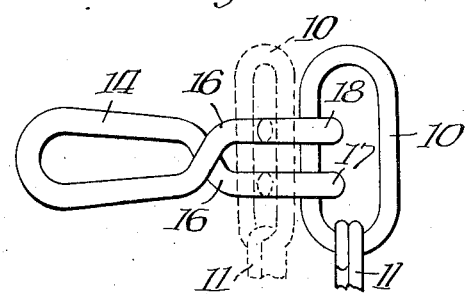

It will be understood that the circumferential chains lie on opposite sides of the tire and have a diameter less than the maximum diameter thereof. As this fact is well known it is unnecessary here to show the circumferential chains further than to illustrate a single link 10 and a fragment of the adjacent link 11 shown in full lines in Figure 4.

Figure 1:
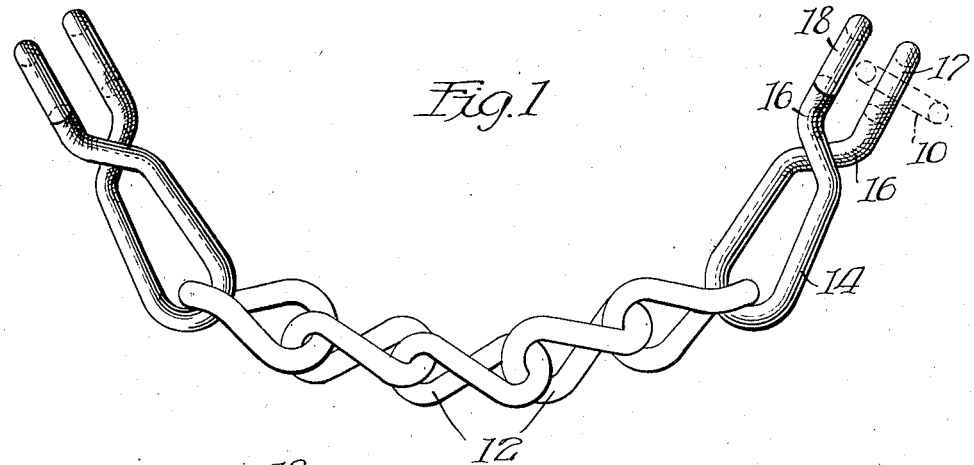
Figure 1 is a view of a cross chain having terminal members embodying my invention.
Figure 2:
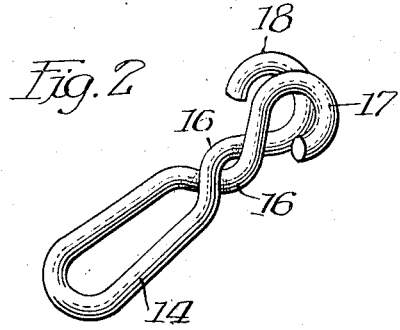
Figure 2 is a perspective view of one of the terminal members of the cross chain.

The device, which embodies the essence of my invention, is shown separately in perspective in Figure 2. It consists of a single piece of heavy wire of about the same gauge as the wire which forms the cross chains 12. The wire of my device is bent to form a loop 14 which at one end is passed through the end link of the cross chain. At the other end the loop is closed by a cross or twist 16 beyond which are located two hooks 17, 18. These hooks face in opposite directions and are arranged in parallel planes side by side, that is, they are coaxial although they are spaced apart approximately equal to the thickness of the link 10 to which they are to be attached. If my device is made of spring steel the spacing is usually slightly less than the thickness of the wire of the links of the circumferential chain, the purpose being to make it doubly sure that they will not become accidentally disconnected.

The amount of the twist may be varied, although I prefer that it shall be such that the plane of the loop 14 shall be at right angles to the planes of the hooks. The twist may be so formed, however, that when made of spring steel the hooks may move slightly toward and from each other to permit the chain link of the circumferential chain to be inserted or removed. It is desirable, however, that the hooks be held approximately in fixed relation to their common axis.

It will be noted that the plane of the loop 14 is at right angles to the planes of the hooks. Also that the wire in passing the twist passes first over the other side, then downward, then curves upward and backward to form the hook. This makes a good twist and increases the strength of the device.

In the form shown the hooks form closed eyes except for a space slightly greater than the thickness of the wire of which the terminal device is made. This assures that the device will not become disengaged accidentally.

While the wire of which my device is made may be resilient it is of sufficient strength and diameter to hold the hooks approximately rigid in their spaced relation. This effect is enhanced by the further fact that the hooks are close coupled in the sense that the twist 16 occurs near the base of the hook, the purpose of these characteristics being to normally hold the hooks just far enough apart to receive the ordinary tire chain link without any appreciable degree of side lash.

Figure 3:
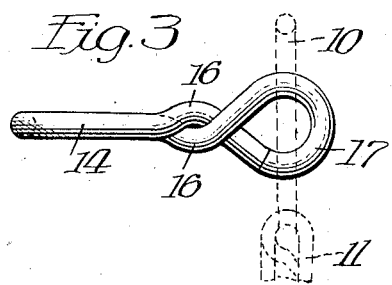
Figure 3 is a view of the terminal member, viewing the same at right angles to the axis of the hooks.

In practice, the hooks may be readily attached and detached by proper manipulation, which will be evident to any mechanic handling the device. For example in attaching the hooks one side of the link 10 may first be passed between the two hooks 17 and 18 as indicated in dotted lines in Figure 3. After it has passed the points of the hooks the latter may be rotated 90 degrees whereupon the parts will assume the position shown in dotted lines in Figure 4. Thereupon the parts may be swung to the position shown in full lines in Figure 4.

It will be understood, of course, that when the apparatus is completely assembled the cross chains will hold the fastening device in a plane approximately at right angles to the circumferential chains. Consequently there is no possibility of the hooks becoming accidentally detached. On the other hand the user may readily manipulate the parts in such manner as to connect or disconnect the hooks quickly and easily and without the aid of any tool.

My device is simple to make, durable, and rugged, and in fact may be of even greater strength than the links of the cross chain; hence my device may be made to outlast the rest of the equipment.

Having thus described my invention what I claim as new and desire to secure by Letters Patent is:

1. A cross chain for vehicle tire anti-skid chains having a terminal element consisting of rigid wire bent to form a loop, said loop being adapted to be connected to the cross chain and to lie flat on the tire, the wire extending from said loop being bent to form two substantially circular hooks arranged in parallel planes and placed coaxially and facing in opposite directions, the hooks being spaced apart a distance substantially equal to the diameter of the wire of a side chain link, said hooks being so arranged that they can only be applied and removed from a side chain link when the plane of that link is at substantially a right angle to the longitudinal axis of the terminal element.

2. A cross chain for vehicle tire anti-skid chains having a terminal element consisting of rigid wire bent to form a loop, said loop being adapted to be connected to the cross chain, the wire extending from said hook being bent to form two hooks arranged in parallel planes and placed coaxially and facing in opposite directions, the hooks being spaced apart a distance substantially equal to the diameter of the wire of a side chain link and the end portion of each hook being a substantial continuation of the general curvature of the hook, the end of each hook being spaced from the body thereof a distance slightly greater than the diameter of the wire of a side chain.

In witness whereof, I have hereunto subscribed my name.

WILLIAM G. CHASE.